United States Patent [19]

Diem

[11] 3,998,491
[45] Dec. 21, 1976

[54] FORAGE TRAILER
[75] Inventor: Oskar Diem, Richardton, N. Dak.
[73] Assignee: SOS Consolidated, Inc., Birmingham, Mich.
[22] Filed: Feb. 25, 1975
[21] Appl. No.: 552,991

[52] U.S. Cl. .................................. 298/11; 298/23 F
[51] Int. Cl.² ......................................... B62B 1/00
[58] Field of Search ............. 298/11, 7, 17.7, 23 F; 214/82

[56] References Cited
UNITED STATES PATENTS

| 2,899,172 | 8/1959 | Cresci | 298/11 |
| 3,322,464 | 5/1967 | Merritt et al. | 298/7 |
| 3,450,284 | 6/1969 | Diem | 214/82 |
| 3,863,985 | 2/1975 | Zuber | 298/11 |

FOREIGN PATENTS OR APPLICATIONS

| 535,592 | 2/1955 | Belgium | 298/11 |
| 1,094,286 | 12/1960 | Germany | 298/11 |
| 714,296 | 11/1941 | Germany | 298/11 |
| 152,316 | 11/1955 | Sweden | 298/11 |
| 1,176,929 | 1/1970 | United Kingdom | 298/11 |

Primary Examiner—Robert J. Spar
Assistant Examiner—Ross Weaver
Attorney, Agent, or Firm—Robert E. Kleve

[57] ABSTRACT

The invention comprises a forage trailer. The trailer has an upper and lower frame with a scissor mechanism to raise and lower the upper frame. The lower frame has wheels thereon for towing. The upper frame has a box pivotally mounted to one side of the upper frame with hydraulic cylinders to pivot the box from horizontal to an angle. The box has one side wall in the direction of the pivoting action which opens up automatically to allow materials within the box to be emptied from the box while pivoted through the opening in the side wall of the box. The opening automatically closes when the box is pivoted back to horizontal.

2 Claims, 11 Drawing Figures

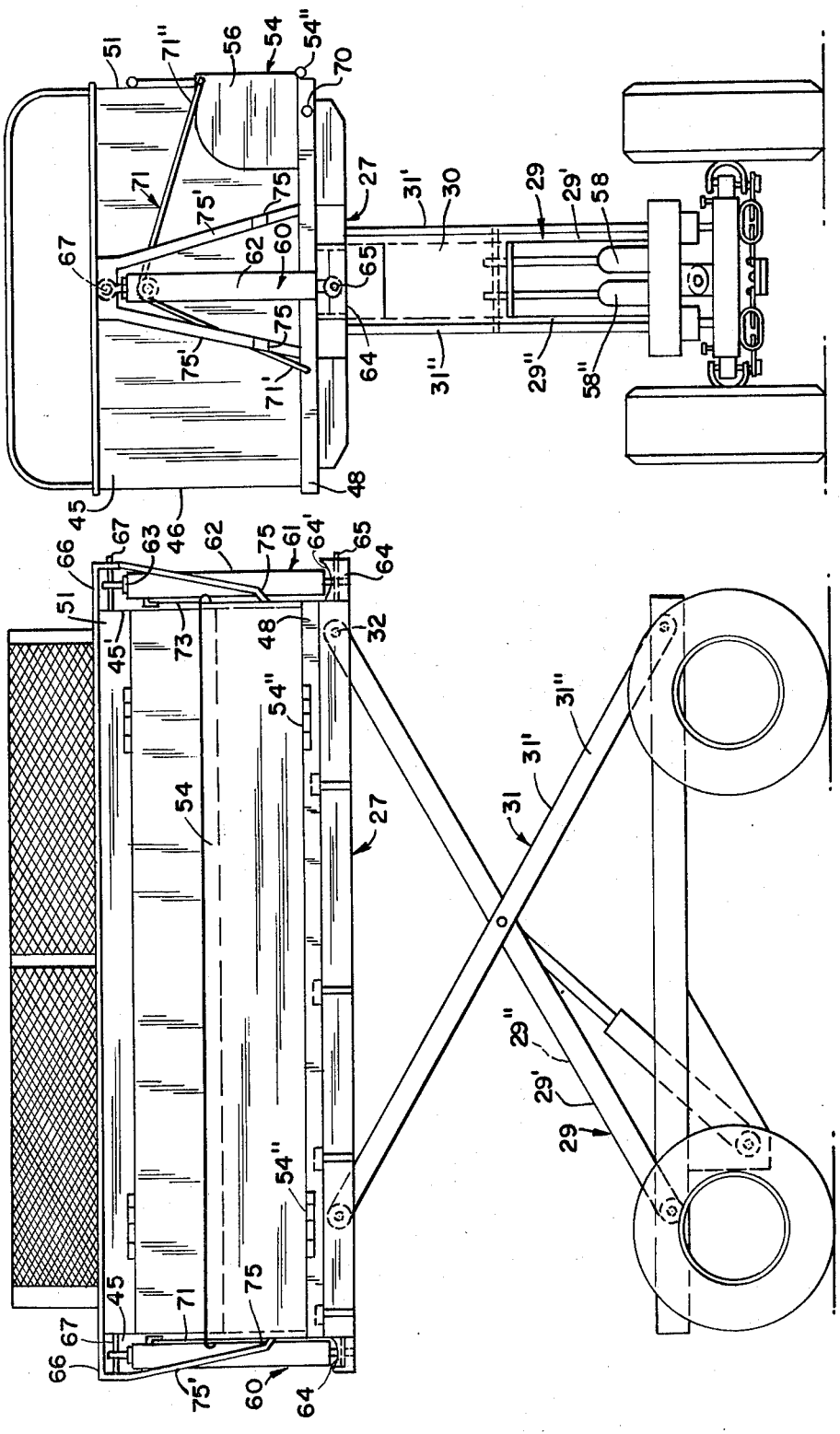

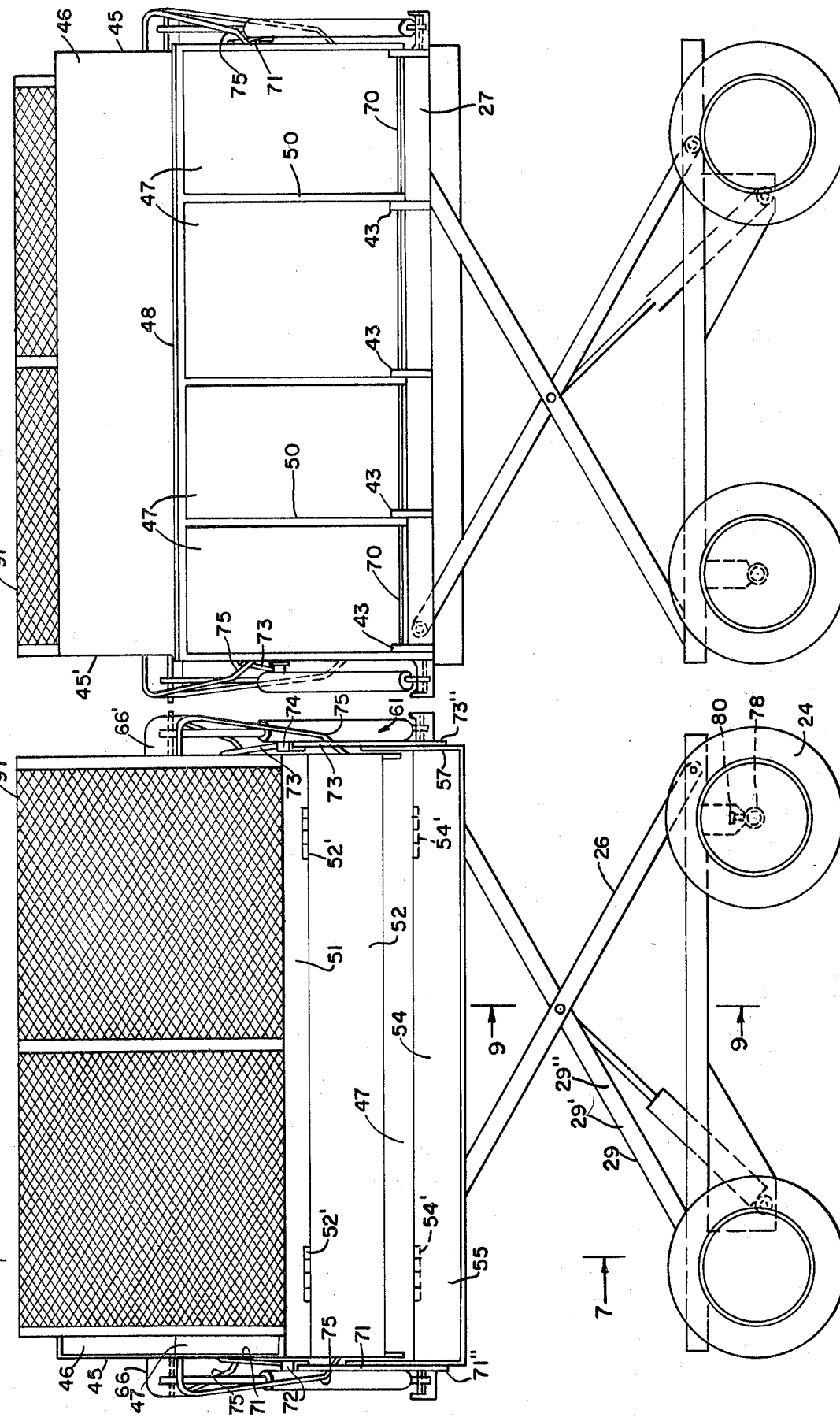

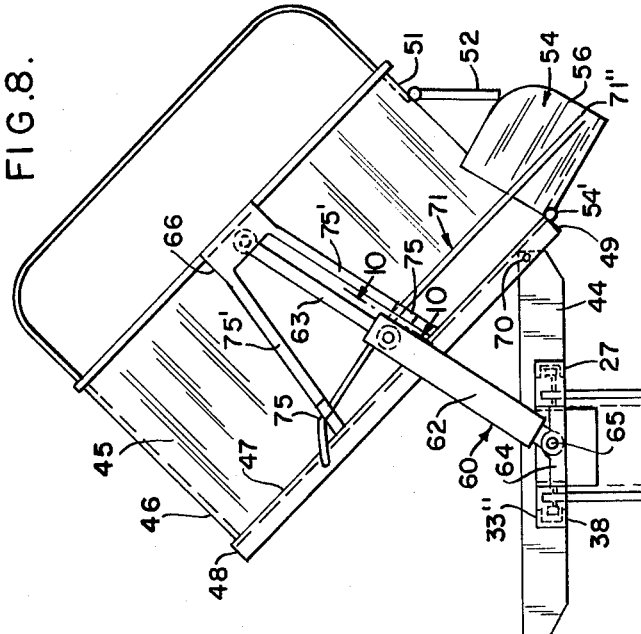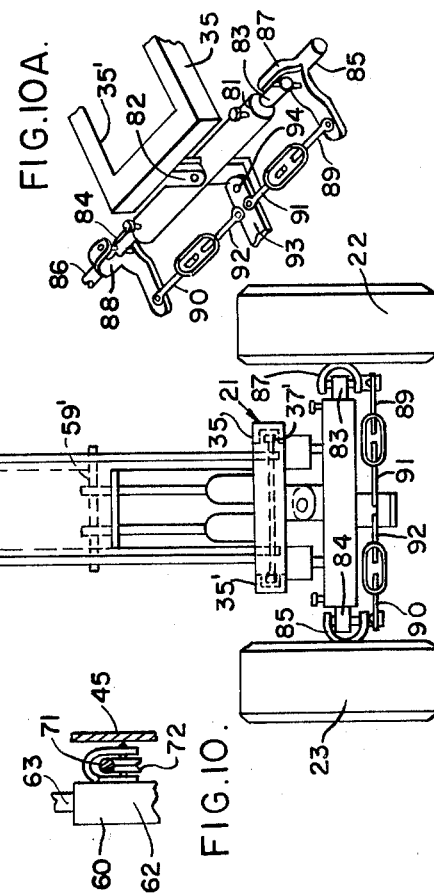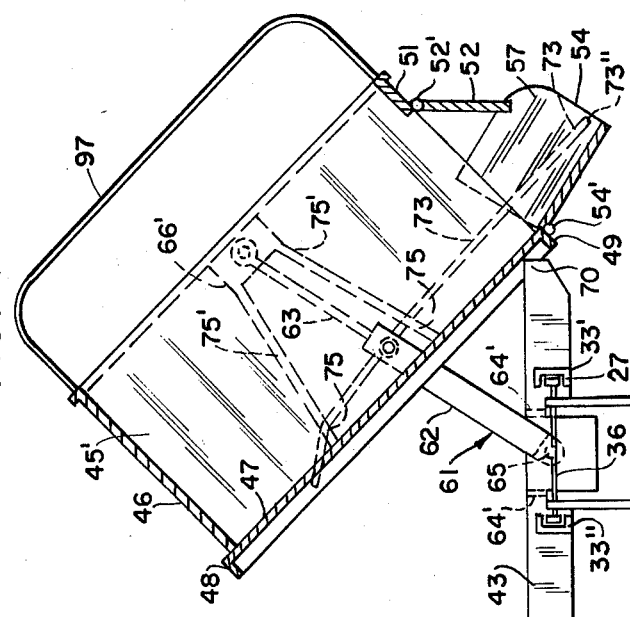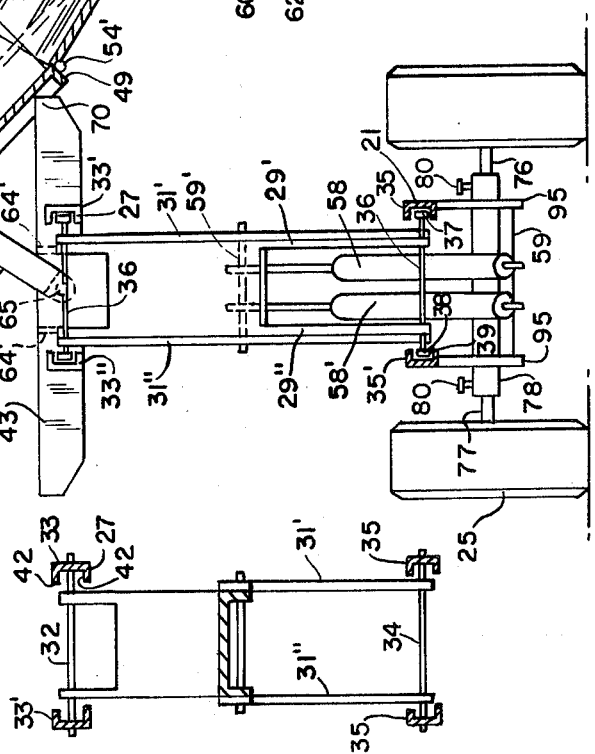

FORAGE TRAILER

This invention relates to forage trailers.

It is an object of the invention to provide a novel forage trailer having a box therein which can be raised to a selected height and then pivoted to one side with the one side of the box opening up to allow material within the box to be emptied.

It is another object of the invention to provide a novel forage trailer which has a box which can be raised to a selected height for emptying the contents of the box into receptacles of different heights, wherein the box when raised to its selected height may be pivoted to empty the box with one wall of the box opening up automatically to allow the material therein to be emptied from the box.

It is another object of the invention to provide a novel forage trailer which has a box that can be raised and tipped for emptying and lowered for towing.

Further objects and advantages of the invention will become apparent as the description proceeds and when taken in conjunction with the accompanying drawings wherein:

FIG. 3 is a side elevational view of the forage trailer with the box raised.

FIG. 4 is a front elevational view of the forage trailer with the box raised.

FIG. 5 is a side elevational view of the forage trailer with the box raised and angled for emptying.

FIG. 6 is a side elevational view of the forage trailer from the opposite side of FIG. 5 with the box raised and angled for emptying.

FIG. 7 is an end elevational view of the forage trailer with the box raised and angled.

FIG. 8 is a cross-sectional view taken along line 8—8 of FIG. 5 with the box raised and angled.

FIG. 9 is a cross-sectional view taken along line 9—5 of FIG. 5.

FIG. 10 is a cross-sectional view taken along line 10—10 of FIG. 8.

FIG. 11 is a fragmentary top view of the steering mechanism for steering the trailer as it is towed.

Figure 2:
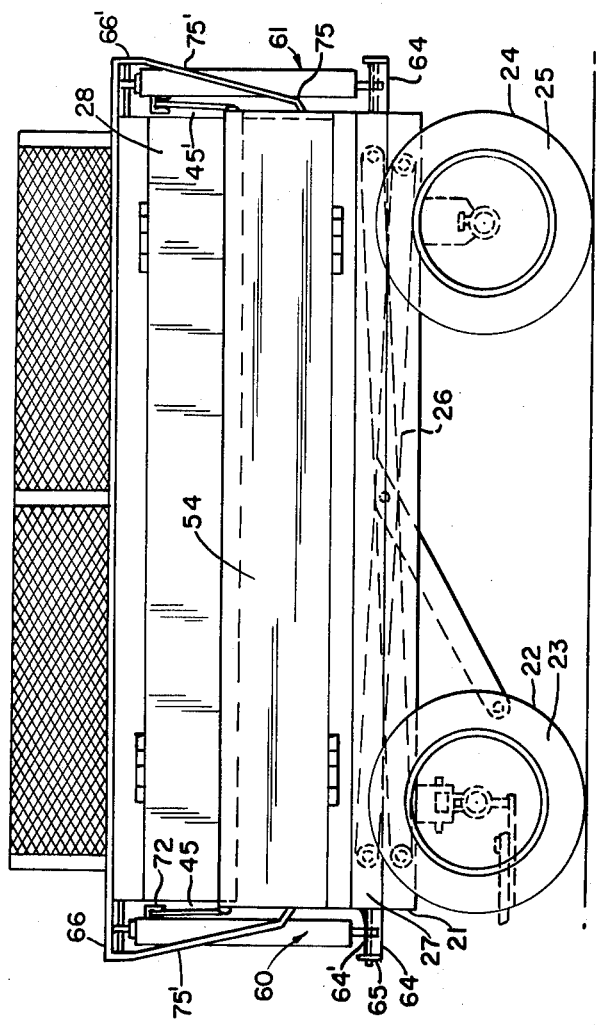
FIG. 2 is a side elevational view of the forage trailer with the box lowered for towing.

Briefly stated, the invention comprises a forage trailer having four wheels on a frame, a scissor-like raising and lowering mechanism is mounted on said frame, a second frame is mounted to the top of said scissor mechanism, a box is pivotally mounted to said upper frame to pivot to one side of said upper frame, said box has side wall portion which pivots open to form a trough when the box is pivoted to one side to facilitate emptying the box, said scissor-like mechanism acting to raise and lower the upper frame and box to a selected height to pivot the box for emptying it.

Referring more particularly to the drawings, in FIGS. 1 – 4, the forage trailer is illustrated as having a rectangular narrow base frame 21, with four wheels 22, 23, 24, and 25 mounted to the base frame, a raising and lowering scissor-like mechanism 26 is mounted to the top of the base frame, and an upper frame 27 is mounted to the top of the mechanism 26, a box 28 is pivotally mounted to the upper frame to pivot to one side of the frame.

The raising and lowering mechanism 26 has one leg member 29 formed of a pair of plated 29' and 29" which are fixed together by a connecting plate 30.

The mechanism also has another leg member 31 formed of legs 31' and 31".

The leg members 29' and 29" are pivotally mounted at their upper ends to a rod 32 which rod 32 is fixed between the side plate 33 and 33' of the upper frame thereby pivotally mounted to the one ends of the leg members 29' and 29" to the upper frame.

The leg members 31' and 31" are pivotally mounted at their lower ends to a rod 34 which rod 34 is fixed between the side channel plates 35 and 35' of the lower frame to thereby pivotally mount the lower ends of leg members 31' and 31" to the lower frame.

The lower ends of rods 29' and 29" have a lateral rod 36 extending laterally therethrough with rollers 37 and 38 rotatably mounted on the rods. The rollers roll along the upper surface 39 of the bottom flanges of the side channel plates 35 and 35' of the lower frame with the side plates providing a guideway for the rollers to move back and forth along the side plates.

The upper ends of rods 31' and 31" also have a lateral rod 36 extending laterally therethrough with rollers 40 and 41 rotatably mounted on the rods. The rollers roll along the upper surfaces 42 of the upper flanges of the side channel plates 33 and 33' of the upper frame.

A pair of hydraulic cylinders 58 and 58' have each their cylinder portions and piston portions with lugs on the cylinder portion and eyelets on their piston portions. The lugs of the cylinders are pivotally mounted to the shaft 59 on the lower frame. The shaft 59 is fixed between plates 95 which plates are fixed to the bottom of plates 35 and 35'. The eyelets on the pistons are pivotally mounted on the shaft 59' where the two legs 29 and 31 of the scissor mechanism are pivotally connected. Consequently, actuating the cylinders 58 and 58' to telescope their pistons relative to their cylinders pushes the shaft 59' upward causing the scissors legs 29 and 31 to pivot to a wide angle relative to one another with the rollers on the one ends of the legs rolling backward along the channels 33, 33', 35, and 35' in the upper and lower frame toward the pivotally mounting of the other end of the legs, thus raising the upper frame and box relative to the lower frame.

Retracting the pistons into the cylinders causes the shaft, where the two legs to the scissor mechanism are pivotally connected, to be lowered which then causes the one ends of the legs to roll forward toward the end of the upper and lower frame until the legs are nearly closed and the upper frame is resting on the lower frame, as illustrated in FIG. 2 with the side plates providing a guideway for the rollers to move or roll back and forth along the side plates.

The upper and lower frames are substantially identical in size and shape.

The upper frame has a plurality of laterally extending rods 43 which are fixed laterally across the top of the upper frame in spaced parallel relation. The lateral rods 43 have each depending fins 44 which are fixed to the rods and to the side plates of the upper frame to reinforce the lateral rods 43.

BOX

The box 28 has a pair of solid side walls 45 and 45' and a back wall 46 and a bottom wall 47 fixed together. An inverted L-shaped flange or skirt 48 extends about the bottom edge of the side walls and back wall and depends below the bottom wall. An inverted L-shaped flange 49 extends across the open front of the box and is fed to the flanges 48 to form a flange extending about the box.

A plurality of ribs 50 extend along the underside of the bottom wall in spaced parallel relation.

A narrow strip or plate 51 is fixed across the open front of the box. A pivotally mounted plate 52 is pivotally mounted to the lower edge of the plate 51 by hinges 52' to pivot freely about the axis 53.

A trough 54 has an elongated plate 55 with laterally bent end portions 56 and 57. The bottom edge 54' of elongated plate 55 of the trough is pivotally mounted to the flange 49 of the box by hinges 54' to pivot open and closed over the open front of the box.

A pair of hydraulic cylinders 60 and 61 have each a cylinder portion 62 and piston member 63. The cylinder portions are pivotally mounted to the upper frame and the pistons pivotally mounted to the box to hydraulically pivot the box relative to the upper frame. The cylinder portions 62 have each lugs at their lower ends. The upper frame 27 has a pair of horizontally extending U-shaped plate members 64 fixed to opposite ends of the upper frame with pins 65 fixed to opposite ends of the upper frame with pins 65 fixed between the apex plate members 64 and the ends of the frame and with the legs of the cylinder pivotably mounted to the pins 65 to provide the pivotal mounting of the cylinder portions to the upper frame. The U-shaped plate members 64 have notched out areas 64' to enable the cylinders to pivot in a wide range about the pins.

The box has a pair of depending flanges or plates 66 and 66' which project outward and depend downward from the sides of the box. The pistons 63 of the cylinders 60 and 61 are pivotally mounted to the pins 67. Pins 67 are fixed between the plates 66 and 66' and the sides of the box.

The box is pivotally mounted to the upper frame by a shaft 70 which extends through eyelets in the rods 43 of the upper frame and which passes through bores in ribs or braces 50 in the box and the L-shaped flanges at the edge of the box which rods and L-shaped flanges are rotatably mounted to the shaft 70 to thereby enable the box to pivot about the axis of the shaft 70.

The box has a cable 71 which is on one side of the box. The cable 71 is fixed at its one end 71' to the box and passes about a rotatable pulley 72 mounted behind the cylinder 52 and is attached at its other end to the end flange 56 of the trough 54 at its other end.

The box also has a cable 73 on the other side of the box. The cable 73 is fixed at its one end 73' to the box and also passes about a rotatable pulley 74 mounted behind cylinder 53 and is attached at its other end to the end flange 57 of the trough. The pulleys 72 and 74 have each a housing 72' with their housings fixed to the cylinder portions of cylinders 60 and 61, respectively. The pulleys 72 and 74 rotate in their housings.

The cables operate to pivot the trough open when the box is pivoted from its horizontal position shown in FIG. 4 to its angled position shown in FIG. 8 for emptying; since the cables must follow a path through the pulleys, this pivotal movement of the box to an angle shortening the path the cables must follow so that the cables are loose enough to enable the trough member, to which the ends 71" and 73" of the cables are attached to drop open under its own weight by gravity.

The cables operate to pivot the trough closed when the box is pivoted from its angled position to its horizontal position, since the cables also must follow a path through the pulley, this pivoting of the box, from angled to a horizontal position, lengthens the path the cables must follow which tightens up the cables and draws the trough member back to its position against the box shown in FIG. 4.

The plate member 52 hangs suspended on its pivotal mounting and will swing back flush against the front of the box before or ahead of the trough member, because of their relative position, so that the trough member will close over the outside lower edge of the plate, as shown in FIG. 4, when the box is pivoted back to horizontal.

The trough members have a plurality of holes so that the cables at their one ends 71" and 73" may be adjusted to different holes to assure the trough member will be drawn flush against the box with the cable taunt when the box is horizontal.

This change in the path that the cables must follow is caused by the fact that as the one end of the box moves up to its angled position with the cables rolling along the pulley this moves the ends 71' and 73' of the cables upward toward the pulleys. This creates less bend in the travel of the cables from the one end over the pulley to the trough where the other ends are mounted while the distance between the one ends and the other end remain relatively constant which produces the slack in the cables. When closing the box back to horizontal the reverse operation takes place.

The cables will also pass over a bent portion 75 of braces 75' at the last moment just as the box is pivoting to its fully angled position which prevents the trough member from pivoting fully opened, so that the side flanges of the trough shall overlap the sides of the box while emptying operation is taken place. This engagement of the cables with the bent portions stops the trough member from fully opening to 90° angle.

The wheels 22 and 23 on the lower frame are steerable on the front and nonsteerable at the rear. The rear wheels 24 and 25 are rotatably mounted on shafts 76 and 77 are slidable in a telescoping manner into the tube 78, which tube is fixed to the underside of the rear at the lower frame by braces 79. A pair of screws 80 and 80' are threaded into the tube to lock the shafts in an adjusted position. By untightening the screws 80 and 80' the shafts 76 and 77 may be slid further out or into to adjust the space between the wheels 24 and 25.

The front wheel assembly also has a tube 81 which is pivotally mounted to the underside of the front of the lower frame at pivot point 82. A pair of shafts 83 and 84 are also slidably mounted in the tube to adjust the spacing between the wheels 22 and 23.

A pair of short shafts 85 and 86 are pivotally mounted to the outer ends of shafts 83 and 84 by collars 87 and 88 about a vertical axes. The wheels 22 and 23 are rotatably mounted to the other end of shafts 85 and 86, whereby the wheels may be turned either from left to right by collars 87 and 88 while rolling on the shafts 85 and 86.

A pair of lugs project outward from the collars 87 and 88 and a pair of tee rods 89 and 90 are pivotally mounted at their one ends to the lugs and are threaded into a turn buckle at their other end. Rods 91 and 92 at their one end are threaded into the other ends of the turn buckles and at their other ends are pivotally mounted to opposite sides of a tow arm 93. The tow arm is pivotally mounted at its one end to the front of the lower frame at pivot point 94 so that by turning the tow arm to either the left or right turns the front wheels to either the left or right simultaneously. The turn buckles may be turned to adjust the rods 89 and 90 axially toward and away from one another when adjusting the wheels 22 and 23 inwardly and outwardly by the telescoping shafts.

A screen 97 may be mounted to the top of the box 28 and forage may be inserted into the box 28 through the opening at the front end of the screen 97.

Figure 1:
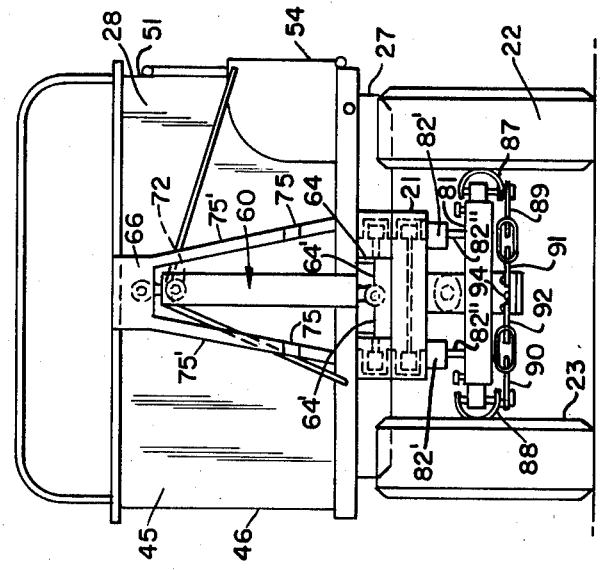
FIG. 1 is a front elevational view of the forage trailer with the box lowered for towing.

The forage trailer may be used for storing forage in the box 28 and towing it from one place to another when the box is in its lowered position shown in FIGS. 1 and 2.

To unload the forage in the box 28 in a truck box, the trailer will be positioned beside the box of the truck, with the side of the box 28 having the trough member 54 facing the side wall of the box of the truck.

By actuating the cylinders 58 and 58' the upper frame 27 and box 28 can be raised to a selected height by the scissor mechanism 26, so that the box 28 is above the side wall of the box of the truck, sufficiently so that the trough member 54 will not engage the side wall of the box of the truck when the box 28 is pivoted.

Thereupon, the box 28 can be pivoted to empty the contents of the box 28 into the truck by actuating the cylinders 60 and 60' to telescoping of the pistons of the cylinders 60 and 60' which acts to pivot the box to an angle of approximately 45°, as shown in FIG. 5, and with the piston action also automatically opening the trough member 54 to its position shown in FIG. 8, so that the contents (forage) in the box 28 may slide out of the box by a gravity action. The contents slides onto the trough into the box of the truck with the trough member guiding the forage into the box of the truck.

When the forage in the box 28 has been emptied, the box can be pivoted back to its horizontal position such as shown in FIG. 4, by the cylinders 60 and 61 being deactuated to retract the pistons of the cylinders 60 and 61 which pivots the box 28 back to its horizontal position, as shown in FIG. 4, and with the deactuating of the cylinders 60 and 61 to retract the pistons also acting to move the trough member back up against the open front of the box 28 to form a part of the wall of the box. Thereupon, the cylinders 58 and 58' may be deactuated to lower the upper frame and box back down to its position shown in FIG. 1. When the box and upper frame are in their position shown in FIG. 1, the vehicle may be towed by the tow arm 93.

The box 28 has a pair of braces 75' and 75" on each side of the box fixed between flanges 66 and 66' and the flanges at the bottom of the box.

The tube 81 may be rigidly secured to the underside of the front frame 21, in which case, the front wheels will not pivot about the axis 82, but will remain in their position, shown in their position shown in FIG. 2, relative to the lower frame 21 at all times.

If the front wheels are allowed to pivot about pivot point 82, a pair of boxes 82' will be fixed to the underside of the frame 21 between the frame and tube 82, as illustrated in FIG. 2.

The boxes will receive hydraulic fluid to project their pistons 82" against tube 81 to lock the tube 81 in its position shown in FIGS. 1 and 4, parallel to the frame.

These hydraulic boxes are conventional and will be actuated to project the pistons to lock the tube 81 relative to frame 21, while the box 28 is being raised and angled for emptying, and returned to its position shown in FIG. 2.

The pistons 82" will be retracted when towing the trailer in its position shown in FIG. 2 so that the front wheels may pivot about axis 82.

The box can be rotated relative to the upper frame to pivot and dump from the other side of the frame, by removing the shaft 70 from the eyelet 94 in the rods 43 and from the bores in the braces 50 of the box, and detaching the cylinders at their lower ends of the upper frame, and rotating the box 180°, and insert the shaft 70 through the eyelets 95 in the rods and back into the bores in the braces 50 of the box and reattaching the cylinders to the upper frame, whereupon actuation of the cylinders will cause the box 28 to pivot and dump from the other side of the frame.

It will be obvious that various changes and departures may be made to the invention without departing from the spirit thereof and accordingly, it is not intended that the invention be limited to that specifically described in the specification or as illustrated in the drawing, but only as set forth in the appended claims wherein:

What is claimed is:

1. A forage trailer device comprising an upper and lower frame, said lower frame having wheels thereon for rotatably supporting said lower frame, a scissor-like raising and lowering mechanism connected between said upper and lower frame, said scissor mechanism being adapted to rest between the confines of said upper and lower frame when said upper frame is lowered adjacent said lower frame, hydraulic means to raise said scissor-like pivoting fashion to thereby raise said upper frame in relation to said lower frame, an elongated box above said upper frame, said box having bottom, front and rear and opposing side walls and being pivotally mounted to the upper frame along one side edge of one of said side walls whereby said box may pivot laterally at its length about said pivot to an angle on one side of said upper frame, said box having at least the lower part of said one of said side walls have flanges forming a trough and separable from said box, and pivotally mounted to pivot open away from said box to form an opening in said box, pivotal hydraulic cylinder means having its lower most ends pivotally mounted to said upper frame and its uppermost end pivotally mounted to said box intermediate the height of said box, pulley means mounted to said pivotal cylinder means, flexible cable means having its one end attachable to said box and passing through said pulley means with its other end attached to said side wall forming a trough whereby actuation of said pivoting cylinder means to pivot said box to an angle for emptying also moves said cable means to actuate said lower part of said one side wall to release and enable said lower part to separate from said box to cause said lower part of said one side wall to act as a trough for emptying said box, and whereby actuation of said hydraulic cylinder means in the opposite direction causes said box to pivot back to a horizontal position and also moves said cable in the opposite direction which causes said lower part of said wall to pivot back toward said box to a flush vertical position across said side of box to close said opening in said box.

2. A forage trailer device comprising an upper and lower frame, said lower frame having wheels thereon for rotatably supporting said lower frame, a scissor-like raising and lowering mechanism connected between said upper and lower frame, said scissor mechanism being adapted to rest between the confines of said upper and lower frame when said upper frame is lowered adjacent said lower frame, hydraulic means to raise said scissor mechanism in a scissor-like pivoting fashion to thereby raise said upper frame in relation to said lower frame, an elongated box above said upper frame, said box having bottom, front and rear and opposing side walls and being pivotally mounted said upper frame along one side edge of one of said side walls whereby said box may pivot laterally at its length about said pivot to an angle on one side of said frame, said box having at least the lower part of said one of said side walls having flanges forming a trough and separable from said box, and pivotally mounted to pivot open away from said box to form an opening in said box, pivotal hydraulic cylinder means having its lower end pivotally mounted to said upper frame and its upper end pivotally mounted to said box, pulley means mounted to said pivotal cylinder means, flexible cable means having its one end attachable to said box and passing through said pulley means with its other end attached to said side wall forming a trough whereby actuation of said pivoting cylinder means to pivot said box to an angle for emptying also moves said cable means to actuate said lower part of said one side wall to release and enable said lower part to separate from said box to cause said lower part of said one side wall to act as a trough for emptying said box, and whereby actuation of said hydraulic cylinder means in the opposite direction causes said box to pivot back to a horizontal position and also moves said cable in the opposite direction which causes said lower part of said wall to pivot back toward said box to a flush vertical position across said side of box to close said opening in said box.

* * * * *